A. S. KROTZ.
AUTOMOBILE ENGINE.
APPLICATION FILED DEC. 16, 1908.
940,031.
Patented Nov. 16, 1909.
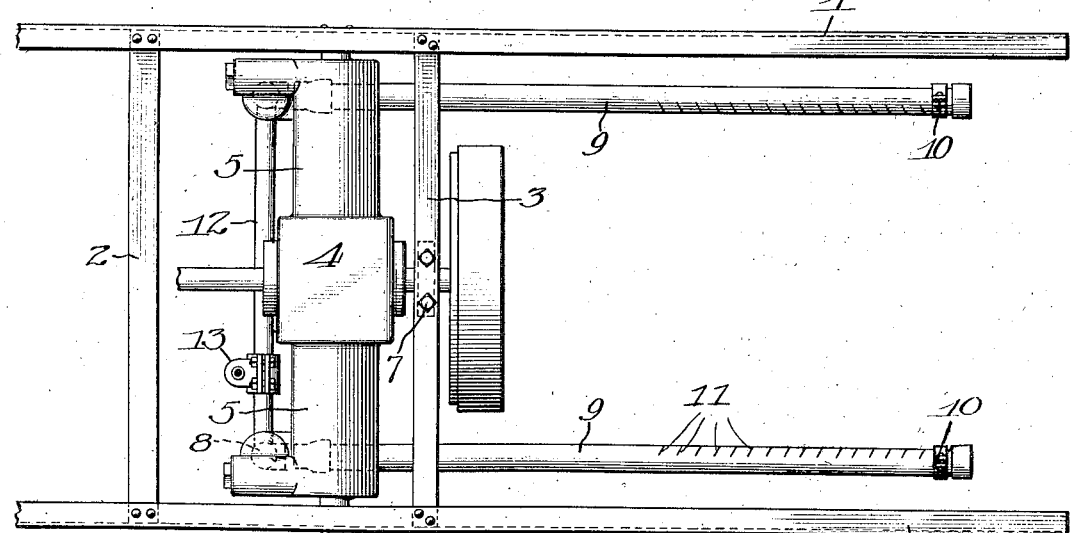
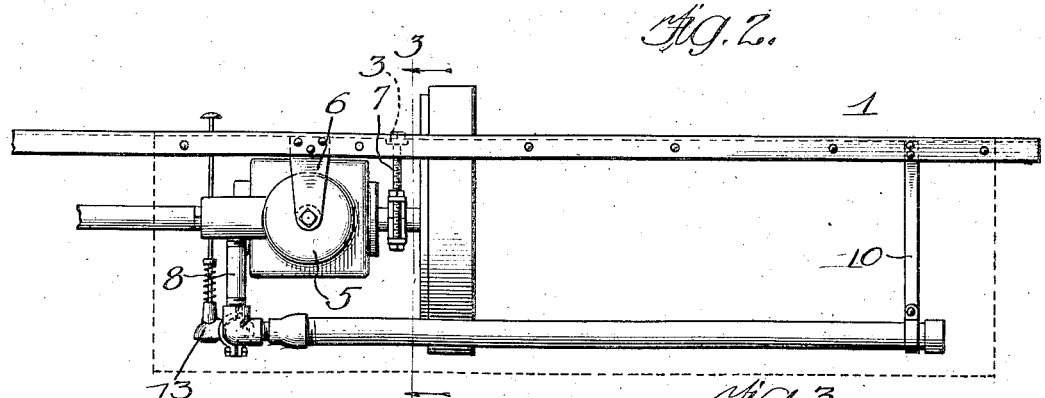
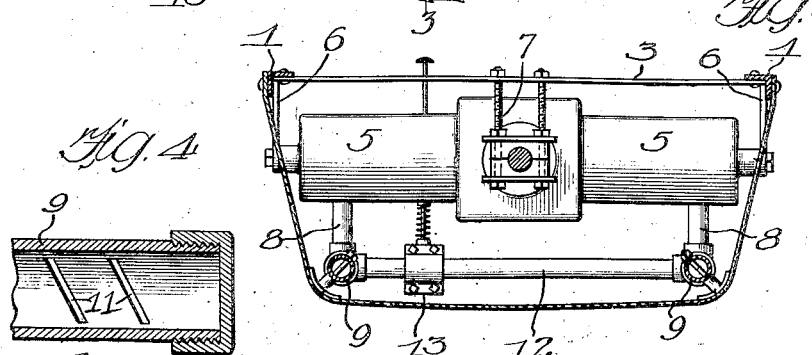
Witnesses:
Albert J. Samuels
Robert H. Weir
Inventor:
Alvaro S. Krotz
By Luther L. Miller
Atty.

UNITED STATES PATENT OFFICE.

ALVARO S. KROTZ, OF CHICAGO, ILLINOIS, ASSIGNOR TO SEARS, ROEBUCK & COMPANY, OF CHICAGO, ILLINOIS, A CORPORATION OF ILLINOIS.

AUTOMOBILE-ENGINE.

940,031.   Specification of Letters Patent.   Patented Nov. 16, 1909.

Application filed December 16, 1908. Serial No. 467,867.

*To all whom it may concern:*

Be it known that I, ALVARO S. KROTZ, a citizen of the United States, residing at Chicago, in the county of Cook and State of Illinois, have invented certain new and useful Improvements in Automobile-Engines, of which the following is a specification.

One of the objects of this invention is to provide improved means for discharging the exhaust from internal combustion engines,—a means which shall obviate the necessity of using special muffling devices of the ordinary type, which shall create as little back-pressure as possible upon the engine, and which shall be of simple, inexpensive and durable construction.

A further object of the invention is to utilize the exhaust piping for supporting a "pan" below the engine.

In the accompanying drawings Figure 1 is a top plan view of a portion of an automobile chassis showing an engine and exhaust pipes supported thereby. Fig. 2 is a side elevation of the structure shown in Fig. 1. Fig. 3 is a section on line 3 3 of Fig. 2. Fig. 4 is a fragmental longitudinal section through one of the exhaust pipes.

In the drawings 1 designates the longitudinal sills of an automobile chassis, said sills being connected by the cross bars 2 and 3. The engine 4, in the form herein illustrated, comprises two opposed cylinders 5. The engine is supported with its cylinders extending transversely of the chassis and below the same by any suitable means, as, for example, brackets 6 supporting the ends of the cylinders and a hanger 7 engaging one of the bearings for the engine shaft, said hanger being supported by the cross bar 3.

In the embodiment of my invention herein shown, the means for receiving and conducting away the exhaust from the engine comprises two vertically extending pipes 8 each connected at its upper end with the exhaust outlet of one of the cylinders, said pipes consequently being located at opposite ends of the engine. To the lower ends of the pipes 8 are connected the forward ends of the horizontally extending pipes 9, the rear ends of said pipes being supported in any suitable manner, as, for example, by means of hangers 10 secured to the longitudinal sills 1. The rear ends of the pipes 9 may be closed, as herein shown, if desired. Said pipes have exhaust outlet openings therein, preferably in the inner side of said pipes, and in the rear portions thereof. Said openings may be in the form of slots 11, as herein shown, the slots preferably being inclined rearwardly and downwardly, as indicated in Fig. 4. The area of the slots 11 preferably equals or exceeds the cross-sectional area of the pipes 9.

Connecting the lower ends of the pipes 8 and the forward ends of the pipes 9 is a transverse pipe 12. If desired, a relief valve 13 of any common or preferred form may be located in the pipe 12 and arranged for actuation in any suitable manner by the driver of the machine.

The length of the pipes 9 and the cross-sectional area of said pipes and the pipes 8 and 12 are preferably sufficient to constitute said pipes a relatively large receptacle for the exhaust.

In operation, the exhaust from the engine escapes to the atmosphere through the openings 11. Said openings being arranged at intervals in the length of the pipes 9, the exhaust is gradually expanded as it travels toward the rear ends of said pipes, the expansion being so gradual as to reduce the noise to a minimum. I have found that with a system of exhaust pipes as herein shown, the use of special devices for muffling the noise of the exhaust is rendered unnecessary.

When a two-cylinder engine is used, as herein illustrated, explosions occur in the engine cylinders alternately, and both of the pipes 9 and the transverse pipe 12 receive the exhaust from each cylinder. It will therefore be seen that each cylinder is provided with a large outlet close to the engine, whereby a quick exhaust with minimum back-pressure upon the engine is obtained. This large outlet is due partly to the provision of an individual exhaust pipe 9 for each cylinder, and partly to the cross-connection 12, said connection permitting each cylinder to exhaust into both of the pipes 9.

The embodiment herein shown of my invention is susceptible of various modifications, therefore no undue limitation should be understood from the foregoing detailed description.

I claim as my invention:

1. In an automobile, in combination, a chassis; an internal combustion engine comprising two opposed cylinders, said engine being secured to said chassis and being disposed in a horizontal position beneath the chassis and extending transversely thereof; an individual exhaust pipe for each cylinder, said pipe communicating at its forward end with its cylinder and extending lengthwise of the chassis; and a transverse pipe connecting the forward portions of said individual exhaust pipes.

2. In an automobile, in combination, a chassis; an internal combustion engine comprising two cylinders, said engine being secured to said chassis; an individual exhaust pipe for each cylinder, said pipe communicating at its forward end with its cylinder and extending lengthwise of the chassis; a transverse pipe connecting the forward portions of said individual exhaust pipes; and a relief valve located in said transverse connecting pipe.

3. In an automobile, in combination, a chassis; an internal combustion engine comprising two cylinders, said engine being secured to said chassis; an individual exhaust pipe for each cylinder, said pipe communicating at its forward end with its cylinder and extending lengthwise of the chassis; and a transverse pipe connecting the forward portions of said individual exhaust pipes at points relatively close to the cylinders.

4. An engine comprising two opposed cylinders; two vertically extending individual exhaust pipes each connected at its upper end with one of said cylinders; two exhaust pipes affording an outlet for the exhaust, and each connected at one of its ends with the lower end of one of said vertically extending pipes; and a transverse pipe connecting the pipes affording an outlet for the exhaust.

5. An engine comprising two opposed cylinders; two vertically extending exhaust pipes each connected at its upper end with one of said cylinders; two exhaust pipes affording an outlet for the exhaust, and each connected at one of its ends with the lower end of one of said vertically extending pipes; and a transverse pipe connecting the lower ends of said vertically extending pipes and the forward ends of the pipes that afford an outlet for the exhaust.

6. The combination, with an engine, of a pipe communicating at one end with the exhaust outlet of said engine, said pipe being slotted at intervals in its length.

7. The combination, with an engine, of a pipe communicating at one end with the exhaust outlet of said engine, said pipe being slotted at intervals in its length, the slots being inclined.

8. The combination, with an engine, of a pipe communicating at one end with the exhaust outlet of said engine, said pipe being slotted at intervals in its length, the other end of said pipe being closed.

9. The combination, with an engine, of a pipe communicating at one end with the exhaust outlet of said engine, said pipe being slotted at intervals in its length, the slots being inclined, and the other end of said pipe being closed, the aggregate size of said slots being at least equal to the cross-sectional area of said pipe.

ALVARO S. KROTZ.

Witnesses:
WALTER L. HUDSON,
GEORGE L. CHINDAHL.